L. S. STARRETT.
MICROMETER.
APPLICATION FILED DEC. 8, 1915.

1,241,160. Patented Sept. 25, 1917.

INVENTOR
LAROY S. STARRETT
By
ATTORNEY

UNITED STATES PATENT OFFICE.

LAROY S. STARRETT, OF ATHOL, MASSACHUSETTS.

MICROMETER.

1,241,160.   Specification of Letters Patent.   Patented Sept. 25, 1917.

Application filed December 8, 1915.  Serial No. 65,819.

*To all whom it may concern:*

Be it known that I, LAROY S. STARRETT, a citizen of the United States, residing at Athol, county of Worcester, Commonwealth of Massachusetts, have invented certain new and useful Improvements in Micrometers, of which the following is a specification.

This invention relates to micrometers, and particularly to the locking device for holding the spindle of the micrometer in its position of adjustment.

In devices of this sort it is important that the locking device in the clamping action thereof shall not impart a lateral strain on the spindle in its bearing, nor any spreading or opening strain. Inasmuch as the spindle itself through the adjustment thereof secures the accurate measurements, any strain which tends to produce a play, however slight, of the spindle in its bearing may in time seriously affect the accuracy of the instrument by throwing it out of alinement.

The object of the present invention is to provide a micrometer spindle lock which will be capable of quick and certain clamping about the circumference of the spindle at the point where it is to be locked, and which will not impart lateral strain or rotative or longitudinal tendency to the spindle by the clamping action of the lock itself. The construction and operation of my device is fully disclosed in the specification which follows. In the drawings accompanying that specification I have shown an embodiment which has been found satisfactory in actual use and well adapted to commercial production. Throughout the specification and drawings like reference numerals are correspondingly applied, and in the drawings:

Figure 1:
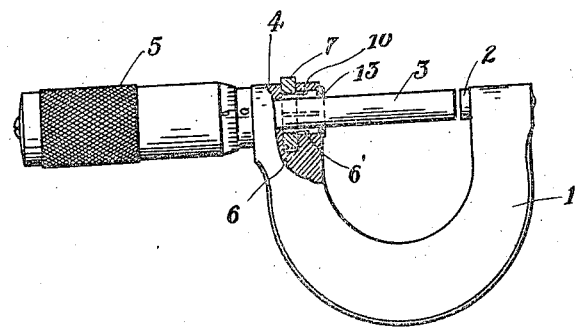
Figure 1 is a side view of a micrometer equipped with a spindle lock in accordance with my invention, the hub being partially broken away to expose the locking device.
Figure 2:
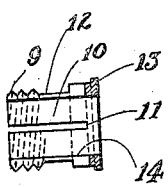
Fig. 2 is an enlarged longitudinal section on the line 2—2 of Fig. 3 of the internal element of the locking mechanism removed.
Figure 3:
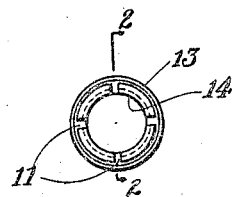
Fig. 3 is an enlarged end view thereof.
Figure 4:
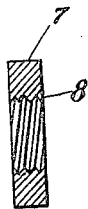
Fig. 4 is an enlarged vertical section of the external operating member of the locking mechanism removed.

I have indicated at 1 the usual frame of the micrometer having an anvil and a rotatable spindle 3 working through a bearing 4 and operated by the usual sleeve 5. The bearing 4 is transversely slotted as indicated at 6 to receive the external operating member 7 of the locking device, and longitudinally counterbored as indicated at $6^1$ to receive the internal element 10. This member 7 is a nut or ring having an internal thread 8 adapted to engage the similar thread 9 of a spindle clamping member 10 set about the spindle 3 in the counter-bore $6^1$ of the bearing 4. The member 10 is a tubular sleeve or bushing slit radially at one or more points as indicated at 11, in the direction of its length so as to secure uniform flexibility with a minimum resistance to the compressive force of the operating ring 7. The sleeve 10 is reduced circumferentially between its ends, as indicated at 12, to secure greater flexibility, and is provided near its outer end as viewed in Fig. 1 with a shoulder 13 disposed to bear against the outer face of the hub and seal the bore $6^1$ against ingress of grit and the like. The interior of the sleeve 10 is formed as a smooth cylindrical spindle engaging bore 14.

The threads 8 and 9 are of suitable shape and of convenient pitch. In the operation of the lock, the threads 8 and 9 ride on one another as the operating ring 7 is rotated in one direction, causing the nut 7 to crowd against the forward wall of the slot through which the member 10 passes. The riding of the threads of the nut on the threads of the bushing causes an inward crowding of the walls of the longitudinally slit bushing. This riding on the threads of the nut on the threads of the bushing is possible through a looseness of thread engagement which permits a partial rotation of the threaded nut relative to the bushing without longitudinal movement of either. As longitudinal movement is prevented, the threads on the nut ride on the threads of the bushing and effect a resultant crowding in of the bushing. This contracts the sleeve 10 without rotating it, thereby firmly clamping the spindle without disturbing its adjustment. This compression, by reason of the slits 11 and circumferentially weakened portion 12 is distributed along the spindle 3, and as the compression is taken up between the shoulder 12 and the nut 7 there is no strain on the spindle bearing. The spindle is released by rotating the operating nut 7 in the reverse direction.

Various modifications in the form and construction of my invention may obviously be resorted to if within the limits of the appended claims.

What I therefore claim and desire to secure by Letters Patent is:

1. In combination with the hub of a micrometer, said hub having a bearing transversely slotted and longitudinally counterbored, a spindle lock comprising a longitudinally slotted spindle clamping element disposed in said counterbore about said spindle and having a shoulder at one end sealing the open end of said counterbore, and an externally disposed operating member in said slot of the bearing having a threaded connection with said clamping member effective to contract said member about said spindle in one direction of movement of the operating member without imparting longitudinal movement to said spindle clamping member.

2. In combination with the hub of a micrometer, said hub having a bearing for the micrometer spindle and said bearing longitudinally counter-bored, a spindle lock comprising a compressible tubular spindle clamp disposed in said counter-bore about said spindle and having a portion at one end sealing the open end of said bore, and externally operable means for contracting said clamping member about said bore without imparting longitudinal movement to said spindle clamping member.

3. A lock for the spindle of a micrometer, comprising a radially weakened clamping member having a suitably-shaped thread, and a rotatable operating member having a suitably-shaped thread disposed for engagement with said thread of the clamping member to contract said member about the spindle upon rotation of the operating member in one direction without imparting longitudinal movement to said spindle clamping member.

4. A lock for the spindle of a micrometer, comprising a fixed longitudinally slitted sleeve disposed about said spindle, a thread on said sleeve, and a rotatable operating member engaging the thread of the sleeve and effective to contract said sleeve about the spindle without imparting longitudinal movement thereto upon rotation of the operating member in one direction.

5. In combination with the hub of a micrometer, said hub having a bearing for the micrometer spindle and said bearing transversely slotted and longitudinally counterbored, a spindle lock comprising a compressible spindle clamping element disposed in said counter-bore about said spindle and having a shoulder at one end sealing the open end of said counter-bore, and an externally disposed operating member in said slot of the bearing and encircling said spindle clamping member, and a suitably-shaped thread between said operating and clamping members effective to contract said clamping member about said spindle in one direction of movement of said operating member without imparting longitudinal movement to said spindle clamping member.

In testimony whereof I affix my signature in presence of two witnesses.

LAROY S. STARRETT.

Witnesses:
ERNEST W. TAYLOR,
FLORENCE E. BOYCE.

Copies of this patent may be obtained for five cents each, by addressing the "Commissioner of Patents, Washington, D. C."